United States Patent [19]
Knighton

[11] 3,910,833
[45] Oct. 7, 1975

[54] APPARATUS FOR RECOVERING SILVER FROM PHOTOGRAPHIC FILM PROCESSING LIQUIDS

[76] Inventor: David R. Knighton, 6106 Linden Lane, Dallas, Tex. 75230

[22] Filed: Sept. 26, 1974

[21] Appl. No.: 509,394

[52] U.S. Cl. ............... 204/273; 204/279; 308/187; 308/187.1
[51] Int. Cl.² .......................................... C25C 7/00
[58] Field of Search ...... 204/212, 273, 279; 277/84, 277/85; 308/187, 187.1

[56] References Cited
UNITED STATES PATENTS
| | | | |
|---|---|---|---|
| 1,959,531 | 5/1934 | Hickman et al. | 204/273 X |
| 3,838,901 | 10/1974 | Sampatacos | 308/187 |

Primary Examiner—John H. Mack
Assistant Examiner—W. I. Solomon
Attorney, Agent, or Firm—Hubbard, Thurman, Turner & Tucker

[57] ABSTRACT

An apparatus is described for the recovery of silver from photographic film processing liquids such as spent photographic fixing solution. The apparatus includes an electrolytic cell having electrode means whereby the silver is recovered by means of electrolysis. A rotary agitator is disposed within the electrolytic cell with said agitator being mounted on a rotating shaft. The rotating shaft extends through the wall of the electrolytic cell and is connected to a suitable driver means outside of said cell. A seal means is described that includes a housing for mounting in the wall of the electrolytic cell. Bearing means are disposed within the housing to engage and support the rotating shaft. A rotating seal member surrounds and is affixed to the shaft within the housing. The rotating seal member contacts a stationary seal member within said housing to form a seal face. A reservoir between the shaft and the housing at a point intermediate the seal face and the bearing means is filled with a suitable seal liquid. The seal liquid is maintained at a pressure sufficient for said seal liquid to be forced onto the seal face as said shaft rotates.

9 Claims, 1 Drawing Figure

U.S. Patent   Oct. 7, 1975   3,910,833
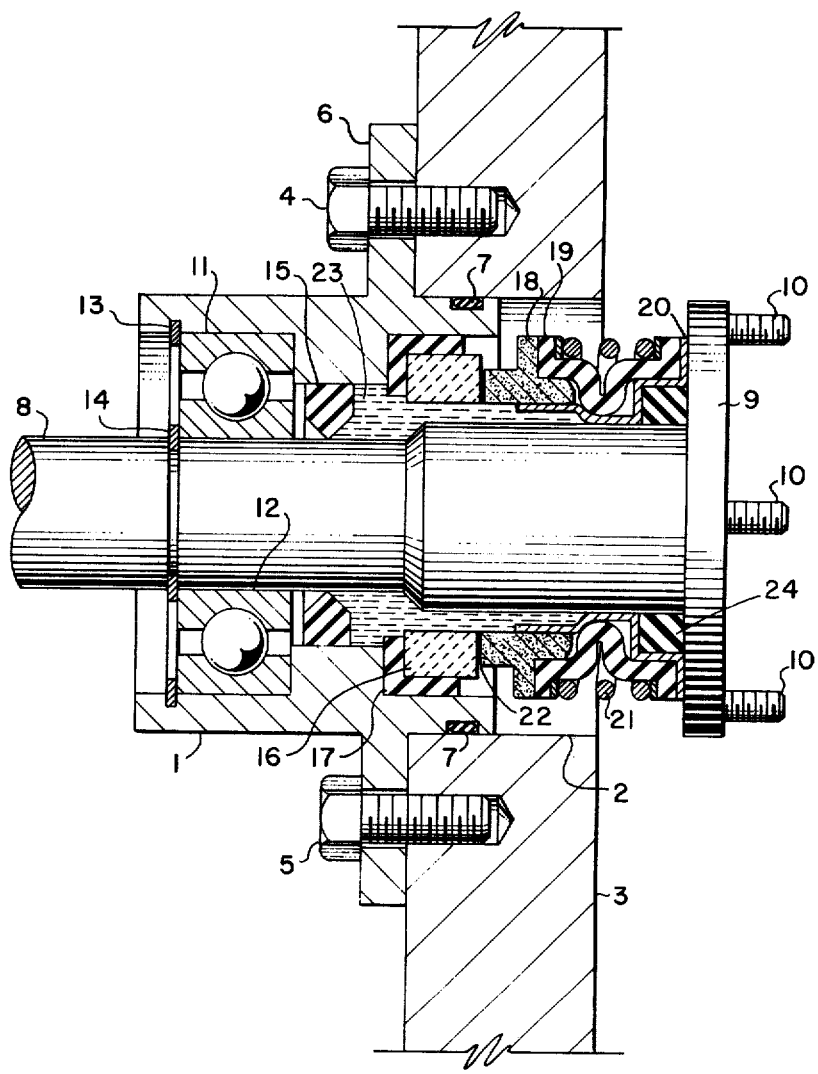

APPARATUS FOR RECOVERING SILVER FROM PHOTOGRAPHIC FILM PROCESSING LIQUIDS

Because of the value of silver, it is economically advantageous to recover silver from used photographic film processing liquids. Several different processing schemes have been suggested for such recovery. One of the most efficient means for recovering silver is a process wherein photographic film processing liquids can be subjected to electrolysis in an electrolytic cell. By using such an electrolytic cell processing scheme, silver can be recovered from photographic film processing liquids by plating the silver out on a cathode submerged in the liquid.

It has been found that the most efficient electrolytic plating process for recovering silver from such liquids is a process wherein the electrolysis is carried out in a closed container with the liquid containing the silver ions being agitated. This agitation serves to evenly distribute the silver ions throughout the solution, thus preventing a depletion of silver ions within the immediate region of the cathode, during the electrolysis process.

Various types of agitator devices have been suggested for maintaining proper agitation within the liquids during the above-mentioned silver recovery process. Such agitation drives have included nondirect magnetic drives. However, such devices tend to wear unevenly, slip and become misaligned. Various other types of agitation devices have been suggested, including devices attached to shaft means that pass through the walls of the electrolytic cell. Devices using the shaft drive means have been a constant source of problems because of the inherently corrosive nature of the photographic film processing liquids. Because of the corrosive nature of such fluids, it has been impossible to devise a satisfactory seal for the shaft, as it passes through the wall of the electrolytic cell. Bearing means become corroded and fail in a very short period of time when they come in contact with even small amounts of the film processing liquids. Increasing contact pressure of packing glands to create tighter seal surfaces has been unsuccessful because heat generated by friction of the tight fitting rotating elements will decompose certain silver containing solutions. Using exotic materials for making the mechanical components of the seal faces and attempts to devise new seal configurations have met with little success because corrosive silver containing fluids still migrate into the bearing means, causing catastrophic corrosion of bearing and shaft surfaces. Air seals to attempt to keep corrosive fluids out of bearing have been unsuccessful because of vaporization of corrosive fluids in the air seal chamber with subsequent condensation of the corrosive fluids in the bearing housing.

It is an object of this invention to provide an improved apparatus for the recovery of silver from a photographic film processing liquid.

It is a further object of this invention to provide an improved apparatus for recovering silver from photographic film processing liquids by electrolysis wherein an improved seal means is utilized to seal a rotating shaft as it enters the electrolytic cell.

It is a further object of this invention to provide an improved seal apparatus for sealing a rotating shaft extending through a stationary wall.

Other objects and advantages of this invention will become apparent from the following description and the accompanying drawing.

The drawing is a side sectional view of a portion of the apparatus of the invention illustrating the seal means, mounted in the wall of a vessel with a portion of the rotating shaft depicted and with the agitator means removed.

The use of electrolysis, or electrolytic plating, to reclaim and recover silver from various liquids, including photographic film processing liquids, has been previously suggested. In such processes, the photographic film processing liquids, such as exhausted fixing solutions, are charged to a closed vessel that is equipped with suitable electrode means. To increase the efficiency of such electrolytic plating processes, it is highly desirable to agitate the solutions containing the silver ions in the electrolysis chamber to prevent any localized depletion of silver ions in the area of the cathode.

In the instant invention, an electrolytic cell, having suitable electrode means to effect the recovery of silver by electrolysis is provided. A silver cathode or other type of suitable cathode can be used in such a known process. A rotary agitator means is connected to a rotating shaft to agitate the liquid within said cell. A suitable driver means to rotate the shaft is positioned outside of the electrolytic cell. Any means known in the art can be used as the driver means, such as an electric motor, having suitable horsepower, with appropriate gear train. A rotating shaft, operably connected to the driver means, passes through the wall of the electrolysis cell and is connected to the agitator inside the electrolysis cell. The rotating shaft passes through a seal housing that is secured to the wall of the electrolysis cell. Such a housing is more adequately described by means of the drawing.

In the drawing, housing 1 is rigidly mounted into aperture 2 that extends through bulkhead 3 of the electrolytic cell by means of bolts 4 and 5 extending through housing flange 6, of housing 1 and anchored in suitably threaded bores in bulkhead 3. For convenience in describing the invention, housing 1 will be described as being generally cylindrical and aperture 2 will be described as a circular aperture in wall 3 of the depicted vessel. The inside of the electrolytic cell is that portion of the drawing appearing to the right of bulkhead 3. Therefore, the main portion of housing 1 is mounted on the outside of bulkhead 3. Normally, the liquid level of the liquid within the electrolytic cell extends above aperture 2, thus submerging the shaft, with its associated components, in the liquid. Flexible O-ring 7 sealedly engages housing 1 and bulkhead 3, thus preventing loss of liquid around the junction of housing 1 with bulkhead 3. Shaft 8, connected to a suitable drive means disposed at the left of the drawing and not shown extends through housing 1 and into the interior of the electrolytic cell at the right of the drawing. Shaft flange 9 is rigidly attached to shaft 8 and carries a plurality of studs 10 for rigidly attaching an agitator means to said shaft (agitator means not shown). Any suitable agitator can be utilized so long as it is capable of maintaining the desired agitation within the electrolysis cell. Suitable agitator means can be paddles, propellers and the like.

A bearing assembly, having an upper race 11 and a lower race 12 supports and rotationally engages shaft 8. Upper race 11 is held in place in the housing 1 by means of snap ring 13. Lower race 12 is rigidly mounted around shaft 8 and horizontally maintained by snap ring 14. While the drawing illustrates one preferred bearing assembly, utilizing a ball bearing assembly, other types of bearings such as roller bearings, sleeve bearings and the like can be utilized to support and rotationally engage said shaft in the housing. Since corrosive fluids are completely isolated from the bearing assembly of the instant invention, there is no particular need in fabricating the bearing components from expensive exotic materials.

Mechanical seal 15 is stationarily mounted in housing 1 and frictionally engages shaft 8. Normally mechanical seal 15 will be an annular seal member that is pressed into housing 1, thus forming a fluid tight seal with the inner walls of the housing. Mechanical seal 15 can be made of any suitable material so long as it is resistant to the sealing liquid, to be more fully described hereafter. One particularly suitable material for fabricating mechanical seal 15 from is neoprene, although various other materials such as teflon, nylon and the like can be utilized. The function of mechanical seal 15 is to prevent any sealing liquid from seeping out of the seal liquid reservoir and into the above-mentioned bearing means. However, if the integrity of mechanical seal 15, around shaft 8 should fail, only non-corrosive sealing liquid, which is itself a lubricant, will come in contact with the bearing assembly.

Stationary seal member 16 is seated in resilient seating ring 17 within housing 1. Stationary seal member 16 can be made of any suitable material, however ceramic sealing members have been found to be especially useful. Stationary seal member 16 can also be made of metals such as stainless steel and the like. Resilient seating ring 17 frictionally engages the inner housing walls and holds stationary seal member 16 in place. Resilient seating ring 17 can be any resilient material such as rubber, thermoplastic materials such as polyolefins, nylon and the like. By utilizing resilient seating ring 17 to hold stationary seal member 16 in place, damage to the seal face, as hereinafter described, can be minimized during operation of the apparatus of this invention. Normally, annular stationary seal member 16 and resilient seating ring 17 can be pressed into housing 1 so that resilient seating ring 17 frictionally engages the inner walls of housing 1.

Annular rotating seal member 18 slidably surrounds shaft 8 such that annular rotating seal member 18 may move horizontally along the axis of shaft 8 as described more fully hereinafter. Flexible collar 19 surrounds at least a portion of rotating seal member 18 and tightly engages rotating seal member 18 to prevent liquid from seeping between the joint and entering the space beneath flexible collar 19. Flexible collar 19 also tightly engages metal liner sleeve 20 in the area surrounding annular sleeve collar 24 to prevent liquid from seeping between the joint between flexible collar 19 and metal liner sleeve 20 and entering the space beneath flexible collar 19. Flexible collar 19 can be made of any suitable material that is not subject to corrosion or deterioration by contact with the liquid being contained in the vessel being agitated, however rubber, polyolefin or other thermoplastic materials are preferred. Metal liner sleeve 20 frictionally engages annular sealing collar 24 in such a manner as to hold annular sealing collar 24 tightly against the surface of shaft 8. Because of this frictional engagement, metal liner sleeve 20 will rotate at the same speed as shaft 8. Annular metal liner also frictionally engages the inner surfaces of rotating seal member 18. Because of this frictional engagement, rotating seal member 18 will rotate at the same speed as metal sleeve 20 and shaft 8. In some instances, rotating seal member 18 and inner sleeve 20 may engage a key in shaft 8 to insure rotation of rotating seal member 18 in conjunction with the rotation of shaft 8. Metal liner sleeve 20 is installed in such a manner as to be forced against shaft flange 9 to produce a tight liquid-tight seal, thus restricting liquid from passing down the joint between the members. Liner sleeve 20 also tightly engages annular sealing collar 24, further preventing any liquid from inside the vessel being agitated from passing along the joint between liner sleeve 20 and the outer sides of sealing collar 24 and ultimately into seal liquid reservoir 23.

Compressed coil spring 21 surrounds shaft 8 and flexible collar 19 with one end of compressed coil spring 21 engaging the out-turned flanged portion of flexible collar 19 to press it tightly against shaft flange 9 and the other end of compressed coil spring 21 engaging the out-turned flanged portion of flexible collar 19. The compressive force of coil spring 21 thereby exerts a horizontal pressure on rotating seal member 18 to cause rotating seal member 18 to move laterally along the axis of shaft 8 and into contact with stationary seal member 16. The flat surface where rotating seal member 18 contacts stationary seal member 16 forms seal face 22.

Annular sealing collar 24 is made of any suitable relatively resilient material such as rubber, neoprene, polyolefins, nylon and other thermoplastics. It is sized such that it frictionally engages shaft 8 to produce a tight liquid-proof joint along the surface of shaft 8 to prevent liquid from migrating from the inside of the vessel being agitated into seal liquid reservoir 23.

During rotation of shaft 8, rotating seal member 18 constantly contacts stationary seal member 16 at annular seal face 22. It is important to insure a smooth surface of stationary seal member 16 and rotating seal member 18 at seal face 22. In some instances it is desirable to use a relatively soft material for fabricating rotating seal member 18 to insure a smooth flat seal face 22 is maintained during operation. It has been found that carbon is particularly well suited as the material to construct rotating seal member 18 from. By utilizing carbon, a smooth flat seal face 22 will be formed and maintained during the rotation of shaft 8. As the surface of rotating seal member 18 gradually wears away due to contact with stationary seal member 16, the action of compressed coil spring 21 will cause rotating seal member 18 to slide horizontally along the axis of shaft 8 to maintain a firm contact with stationary seal member 16. Thus, the integrity of seal face 22 is constantly maintained. While the apparatus has been described as having stationary seal member 16, it is understood that the stationary seal member can also be formd by a smooth face that is an integral part of housing 1.

Seal liquid reservoir 23 is an annular cavity defined by the surface of shaft 8, the inward side of annular mechanical seal 15, housing 1, resilient seating ring 17, stationary seal member 16, rotating seal member 18 and liner sleeve 20. A suitable lubricating liquid is added to seal liquid reservoir 23 at the time the seal apparatus is assembled. The amount of seal liquid added to the reservoir is sufficient to produce a pressure within said reservoir to cause at least a portion of the liquid to be forced from the reservoir out onto seal surface 22. Thus, the force of the pressure exerted on seal liquid within seal liquid reservoir 23 is sufficient to cause a portion of the seal liquid to be forced between the surfaces of stationary seal member 16 and rotating seal member 18 along seal face 22. The pressure should be maintained such that the pressure at the outer extremity of seal face 22 exactly equals the internal pressure of the vessel in which the seal apparatus is installed. By using a seal liquid that has lubricating properties, seal face 23 will operate without undesirable heat buildup.

The seal liquid can be any suitable liquid so long as such liquid exerts a lubricating effect on seal face 22. Of course, the seal liquid should also be compatible with fluids held within the vessel in which the seal apparatus is installed. In the above-mentioned electrolysis process for reclaiming silver from photographic film processing solutions, a light silicon-based oil has been found to be particularly advantageous. However, many other types of seal and lubricating fluids can be used.

Seal liquid is added to reservoir 23 in an amount sufficient to cause at least a portion of the liquid to be forced out onto seal face 22 and to prevent any of the corrosive liquid in the vessel being agitated from entering seal reservoir 23. However, if the pressure inside reservoir 23 is not sufficent to continuously force liquid out onto seal face 22, then other means can be supplied to maintain the desired pressure such as by a conduit through housing 1 into seal liquid reservoir 23 to add additional seal liquid.

Although not shown in the drawing, in some cases it is desirable to install means for adding additional seal liquid to reservoir 23 during prolonged operation of the apparatus. Such means can include a suitable conduit bored through housing 1 such that the conduit is in communication with seal liquid reservoir 23 and a suitable source of the seal liquid. In those instances, it is desirable to install a suitable mechanism to pressurize the seal liquid to a sufficient pressure to cause at least a portion of the seal liquid to be forced onto seal surface 22.

During the normal operation of the above-described seal apparatus, seal fluid, under sufficient pressure, will prevent any of the fluid contained within the vessel in which the housing is installed from leaking back into the bearing means. Therefore, the seal liquid serves the purpose of lubricating seal face 22 and forming a barrier between the fluid contained within the vessel in which the housing is installed and the expensive and delicate bearings. Thus, there is no corrosion found in the bearings due to contact with corrosive liquids within the vessel. Likewise, since seal fluid is constantly coating seal surface 22, no corrosion products are formed on such seal surface. Since no corrosion products are formed on the seal surface, there is no undesirable buildup of heat caused by friction from such corrosion products as is normally found in conventional seal systems. Of course, it is well-known that even slight increases in heat can have a devastating effect on photographic film processing liquids.

While the foregoing specification has been primarily directed to an apparatus for recovering silver from photographic film processing liquids, it should be readily apparent to those skilled in the art that the particularly described seal apparatus can also have utility in a variety of different types of apparatus. Therefore, it should be understood that the seal system is applicable to other types of apparatus and can be used whenever a rotating shaft is passed through a bulkhead wherein fluids having different properties are maintained on opposite sides of the bulkhead. Thus, the above-described seal apparatus can be useable to prevent any corrosive or undesirable fluid from coming in contact with various bearing surfaces utilized with rotating shafts as they pass through various bulkheads. Additionally, the disclosed seal device can be adapted to protect a shaft bearing system that is completely submerged in a fluid by using a bearing housing with a second seal apparatus. In such an arrangement, the bearing system would be disposed in a housing with the disclosed seals on each side of the bearings in back-to-back arrangement. By using two such seals, one on each side of the bearing to be protected, the bearing can be totally isolated from the fluid surrounding it.

The foregoing specification has described only a few of the more preferred embodiments of the instant invention. It will be apparent to those skilled in the art that many modifications and variations may be made which do not depart from the spirit and scope of the invention described and claimed herein.

What is claimed is:

1. An apparatus for recovering silver from photographic film processign liquids which comprises: an electrolytic cell having electrode means to effect recovery of said silver by electrolysis; a rotary agitator means connected to a rotating shaft to agitate liquid within said cell; a driver means to rotate said shaft; and a seal means for sealing said shaft including (a) a shaft housing for mounting in an aperture in the wall of said cell, (b) bearing means within said housing to rotationally engage and support said shaft, (c) a rotating seal member surrounding and affixed to said shaft, said rotating seal member contacting and forming a seal face with a stationary seal member within said housing and said rotating seal member being affixed to said shaft so as to form a liquid reservoir between said shaft and said housing at a location intermediate said seal face and said bearing means and (d) means for maintaining a seal liquid in said reservoir at a pressure sufficient for said seal liquid to be forced onto said seal face as said shaft rotates.

2. The apparatus of claim 1 wherein said rotating seal member engages said shaft to rotate at the same speed as said shaft.

3. The apparatus of claim 2 wherein said seal face and said liquid reservoir are intermediate said bearing means and the interior of said cell.

4. The apparatus of claim 3 wherein a mechanical seal is disposed in said housing at a point intermediate said reservoir and said bearing means, said mechanical seal surrounding and engaging said shaft thereby preventing liquid in said reservoir from entering said bearing means.

5. The apparatus of claim 4 wherein said rotating seal member is slidably affixed to said shaft by a flexible collar surrounding said shaft.

6. The apparatus of claim 4 wherein said stationary seal member is seated within said housing in a resilient seating ring, said seating ring frictionally engaging the interior walls of said housing.

7. The apparatus of claim 6 wherein a compressed coil spring surrounds said flexible collar with one end of said spring engaging a flange rigidly affixed to said shaft and the other end of said spring engaging said rotating seal member to hold said rotating seal member in contact with said stationary seal member thereby establishing and maintaining said seal face during rotation of said shaft.

8. The apparatus of claim 7 wherein said rotating seal member is made of carbon.

9. The apparatus of claim 7 wherein said stationary seal member is a ceramic member.

* * * * *